(12) United States Patent
Kymissis

(10) Patent No.: US 8,750,517 B2
(45) Date of Patent: Jun. 10, 2014

(54) FRIEND OR FOE DETECTION

(75) Inventor: Ioannis Kymissis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 858 days.

(21) Appl. No.: 12/682,216

(22) PCT Filed: Oct. 9, 2008

(86) PCT No.: PCT/US2008/011626
§ 371 (c)(1), (2), (4) Date: Jun. 9, 2010

(87) PCT Pub. No.: WO2009/048599
PCT Pub. Date: Apr. 16, 2009

(65) Prior Publication Data
US 2010/0266126 A1    Oct. 21, 2010

Related U.S. Application Data

(60) Provisional application No. 60/978,434, filed on Oct. 9, 2007.

(51) Int. Cl.
*H04K 1/00*    (2006.01)

(52) U.S. Cl.
USPC .................................................. 380/274

(58) Field of Classification Search
USPC ................... 342/45; 380/270, 274
See application file for complete search history.

(56) References Cited

U.S. PATENT DOCUMENTS

| | | | |
|---|---|---|---|
| 3,573,823 A | 4/1971 | French | |
| 3,618,096 A | 11/1971 | Schoneborn | |
| 4,493,863 A | 1/1985 | Karlsson | |
| 5,280,287 A | 1/1994 | Evans | |
| 5,299,227 A * | 3/1994 | Rose | 342/45 |
| 5,396,243 A | 3/1995 | Jalink et al. | |
| 5,461,392 A | 10/1995 | Mott et al. | |
| 5,748,138 A * | 5/1998 | Telle et al. | 342/45 |
| 5,808,577 A * | 9/1998 | Brinsfield | 342/45 |
| 5,809,171 A | 9/1998 | Neff et al. | |
| 5,890,808 A | 4/1999 | Neff et al. | |
| 5,905,463 A | 5/1999 | Hannan | |

(Continued)

FOREIGN PATENT DOCUMENTS

| | | |
|---|---|---|
| EP | 678755 | 10/1995 |
| EP | 678755 B1 | 8/2002 |

(Continued)

OTHER PUBLICATIONS

"Active camouflage", Wikipedia, http://en.wikipedia.org/wiki/Active_camouflage, (2007), 2 pgs.

(Continued)

*Primary Examiner* — Tamara T Kyle
(74) *Attorney, Agent, or Firm* — Schwegman, Lundberg & Woessner, P.A.

(57) ABSTRACT

An identification friend or foe (IFF) system and method can covertly identify an object as friend or foe (FoF). An encoded illumination signal can be calculated using a detected ambient signal and an identification (ID) signal and emitted. The encoded illumination signal can be detected by analyzing a detected ambient signal and decoded using a specified key.

17 Claims, 7 Drawing Sheets

(56) References Cited

U.S. PATENT DOCUMENTS

| | | |
|---|---|---|
| 5,946,422 A | 8/1999 | Neff |
| RE36,298 E | 9/1999 | Scherrer et al. |
| 5,982,930 A | 11/1999 | Neff |
| 5,982,945 A | 11/1999 | Neff et al. |
| 6,174,169 B1 * | 1/2001 | Gerber .................. 434/11 |
| 6,241,386 B1 | 6/2001 | Limburg et al. |
| 6,249,589 B1 | 6/2001 | Hoch |
| 6,435,454 B1 | 8/2002 | Engelhardt |
| 6,459,076 B1 * | 10/2002 | Schlenker ............... 250/205 |
| 6,545,632 B1 | 4/2003 | Lyons et al. |
| 6,578,492 B1 | 6/2003 | Koch et al. |
| 6,655,292 B1 | 12/2003 | Salzeder |
| 6,731,799 B1 | 5/2004 | Sun et al. |
| 6,899,827 B2 | 5/2005 | Lauf et al. |
| 6,999,620 B1 | 2/2006 | Harville |
| 7,023,361 B1 | 4/2006 | Wallace et al. |
| 7,149,652 B2 | 12/2006 | O'Kane et al. |
| 7,199,344 B2 | 4/2007 | Blake |
| 2002/0090131 A1 | 7/2002 | Alden |
| 2003/0028769 A1 * | 2/2003 | Martin ................... 713/170 |
| 2003/0028783 A1 * | 2/2003 | Collins et al. ............ 713/182 |
| 2003/0147651 A1 | 8/2003 | Roes et al. |
| 2004/0036006 A1 * | 2/2004 | Dowling ................ 250/205 |
| 2004/0213982 A1 | 10/2004 | Touzov |
| 2005/0092408 A1 | 5/2005 | Lauf et al. |
| 2005/0175311 A1 | 8/2005 | Brunson |
| 2006/0275791 A1 | 12/2006 | Belcher et al. |
| 2007/0034774 A1 | 2/2007 | Blake |
| 2007/0035435 A1 | 2/2007 | Dumas |
| 2007/0159809 A1 * | 7/2007 | Kim et al. ............... 362/103 |
| 2009/0010644 A1 * | 1/2009 | Varshneya et al. ......... 398/33 |
| 2009/0045996 A1 * | 2/2009 | Ivtsenkov et al. .......... 342/45 |
| 2009/0058712 A1 * | 3/2009 | Roes et al. ............... 342/45 |
| 2009/0142053 A1 * | 6/2009 | Varshneya et al. ......... 398/33 |
| 2012/0105370 A1 * | 5/2012 | Moore ................... 345/174 |

FOREIGN PATENT DOCUMENTS

| | | |
|---|---|---|
| WO | WO-0058237 A1 | 10/2000 |
| WO | WO-0127654 A1 | 4/2001 |
| WO | WO-2004062591 A1 | 7/2004 |
| WO | WO-2006117036 A1 | 11/2006 |
| WO | WO-2009048599 A1 | 4/2009 |

OTHER PUBLICATIONS

"International Application Serial No. PCT/US2008/011626 Search Report and Written Opinion mailed Dec. 5, 2008", 10 pgs.

"International Application Serial No. PCT/US2008/011626, International Preliminary Report on Patentability dated Apr. 13, 2010", 5 pgs.

"Passive and Active Camouflage Techniques for Micro Vehicles", SITIS Archives—Topic Details, Program: SBIR, Topic No. AF05-154 (AirForce), [online]. http://www.dodsbir.net/sitis/archives_display_topic.asp?Bookmark=20027, (2005), 2 pgs.

"Passive IFF: Autonomous Nonintrusive Rapid Identification of Friendly Assets", NASA's Jet Propulsion Laboratory, Pasadena, California, http://www.techbriefs.com/content/view/378/12, (2004), 2 pgs.

Chen, B., et al., "Dither Modulation: A New Approach to Digital Watermarking and Information Embedding", IS&T/SPIE Conference on Security and Watermarking of Multimedia Contents, (San Jose, California), (Jan. 1999), 342-353.

Crane, David, "Is Cloaking Technology for U.S. Infantry Warfighters Finally Possible?", http://www.defensereview.com/article850.html, (2007), 4 pgs.

Harris, William, "How Invisibility Cloaks Work", http://science.howstuffworks.com/invisibility-cloak.htm, (Copyright 1998-2007), 8 pgs.

Inami, M., et al., "Optical camouflage using retro-reflective projection technology", The Second IEEE and ACM International Symposium on Mixed and Augmented Reality, 2003. Proceedings., (2003), 343-349.

Maor, A., et al., "On Joint Information Embedding and Lossy Compression", ISIT 2004, (Jun. 27-Jul. 2, 2004, Chicago, IL), (2004), p. 195.

McCarthy, Wil, "Being Invisible", http://www.wired.com/wired/archive/11.08/pwr_invisible.html, (Aug. 2003), 4 pgs.

Smith, J. R., et al., "Modulation and Information Hiding in Images", Proceedings, First Information Hiding Workshop. Lecture Notes in Computer Science, vol. 1174, (Isaac Newton Institute, Cambridge, United Kingdom), (May 1996), 21 pgs.

* cited by examiner

FRIEND OR FOE DETECTION

CLAIM OF PRIORITY

This application is a nationalization under 35U.S.C. 371of PCT/US 2008/011626, filed Oct. 9,2008, and published as WO 2009/048599on Apr.16, 2009which patent application claims the benefit of priority under 35U.S.C. Section 119(e), to Kymissis U.S. Provisional Patent Application Ser. No. 60/978,434, filed Oct.9, 2007, which applications and publication are incorporated herein by reference in their entirety.

TECHNICAL FIELD

This document pertains generally to secure communication, and more particularly, but not by way of limitation, to friend or foe detection.

BACKGROUND

Active camouflage can reduce the visibility of a specific asset, such as an unmanned air vehicle (UAV), by controlling the appearance of the asset's surface. Actively camouflaging an asset can include detecting the asset's background view and actively monitoring and mimicking the background view of the asset on the asset's visible surface, thereby making the visible surface of the asset appear like the asset's background even if that background view should change.

OVERVIEW

The present inventor has recognized that once an asset has been camouflaged, there exists a need to detect or identify the camouflaged asset. Identification friend or foe (IFF) refers to a communication system or method of distinguishing friendly assets, such as friendly aircraft, from non-friendly assets, such as enemy aircraft. IFF systems can rely on insignia, radar, infrared or thermal identification, or radio communication to locate or identify assets. However, these types of identification are not reliable, as they can be jammed, intercepted, or mimicked. Thus, the present inventor has recognized that there exists a need to covertly or securely detect or identify an asset.

A friend or foe (FoF) detection system or method can covertly identify an object as a friend or foe. An encoded illumination signal can be calculated using a detected ambient signal and an identification (ID) signal and emitted. The encoded illumination signal can be detected by analyzing a detected ambient signal and decoded using a specified key.

In Example 1, a system includes a first processor configured to receive a first ambient signal, calculate an encoded illumination signal using the received first ambient signal and an identification (ID) signal, and output the encoded illumination signal.

In Example 2, the encoded illumination signal of Example 1 optionally includes at least a portion of the detected ambient signal.

In Example 3, the system of any one or more of Examples 1-2 optionally includes an ambient detector configured to detect the first ambient signal and an emitter configured to emit the encoded illumination signal.

In Example 4, the ambient detector of any one or more of Examples 1-3 is optionally configured to detect an ambient signal from a first location on an outer surface of an object, and the emitter of any one or more of Examples 1-3 is optionally configured to emit the encoded illumination signal from a second location on the outer surface of the object.

In Example 5, the first location on the outer surface of the object of any one or more of Examples 1-4 is optionally substantially adjacent to the second location on the outer surface of the object.

In Example 6, the first location on the outer surface of the object of any one or more of Examples 1-5 is optionally substantially opposite to the second location on the outer surface of the object.

In Example 7, the ID signal of any one or more of Examples 1-6 optionally includes a covert ID signal.

In Example 8, the covert ID signal of any one or more of Examples 1-7 optionally includes a signal below a noise floor.

In Example 9, the emitter of any one or more of Examples 1-8 optionally includes an array of quantum dot light emitting diodes (QDLEDs) configured to be attached to an outer surface of an object.

In Example 10, the system of any one or more of Examples 1-9 optionally includes a friend or foe (FoF) detector configured to detect an ambient signal and a second processor configured to analyze the detected ambient signal to detect an encoded illumination signal and to decode the detected encoded illumination signal using a specified key.

In Example 11, a system includes a first processor configured to receive a first ambient signal, and a second processor configured to analyze the received first ambient signal to detect an encoded illumination signal and to decode the detected encoded illumination signal using a specified key.

In Example 12, the system of Example 11 optionally includes a friend or foe (FoF) detector configured to detect the first ambient signal, an ambient detector configured to detect a second ambient signal, a second processor coupled to the ambient detector, the second processor configured to calculate the encoded illumination signal using the detected ambient signal and an identification (ID) signal, the encoded illumination signal including at least a portion of the detected ambient signal, and an emitter coupled to the first processor, the emitter configured to emit the encoded illumination signal.

In Example 13, a system includes means for receiving an ambient signal, means for calculating an encoded illumination signal using the ambient signal and an identification (ID) signal, and means for outputting the encoded illumination signal.

In Example 14, a method includes receiving a first ambient signal, calculating an encoded illumination signal using the detected first ambient signal and an identification (ID) signal, and outputting the encoded illumination signal.

In Example 15, the method of Example 14 optionally includes detecting the first ambient signal and emitting the encoded illumination signal.

In Example 16, the emitting the encoded illumination signal of any one or more of Examples 14-15 optionally includes emitting at least a portion of the detected ambient signal.

In Example 17, the detecting the ambient signal of any one or more of Examples 14-16 optionally includes detecting from a first location on an outer surface of an object, and wherein the emitting the encoded illumination signal of any one or more of Examples 14-16 optionally includes emitting from a second location on the outer surface of the object.

In Example 18, the detecting from the first location on the outer surface of the object of any one or more of Examples 14-17 includes detecting from a location substantially adjacent to the second location on the outer surface of the object.

In Example 19, the detecting from the first location on the outer surface of the object of any one or more of Examples 14-18 optionally includes detecting from a location substantially opposite to the second location on the outer surface of the object.

In Example 20, the calculating the encoded illumination signal using the ID signal of any one or more of Examples 14-19 optionally includes using a covert ID signal.

In Example 21, the using the covert ID signal of any one or more of Examples 14-20 optionally includes using a signal below a noise floor.

In Example 22, the emitting the encoded illumination signal of any one or more of Examples 14-21 optionally includes using an array of quantum dot light emitting diodes (QDLEDs) configured to be attached to an outer surface of an object.

In Example 23, the method of any one or more of Examples 14-22 optionally includes detecting a second ambient signal, analyzing the second detected ambient signal to detect the encoded illumination signal, and decoding the detected encoded illumination signal using a specified key.

In Example 24, a method includes receiving a first ambient signal and analyzing the received first ambient signal to detect an encoded illumination signal; and to decode the detected encoded illumination signal using a specified key.

In Example 25, the method of claim 24 optionally includes detecting a second ambient signal, calculating the encoded illumination signal using the detected second ambient signal and an identification (ID) signal, and emitting the encoded illumination signal.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
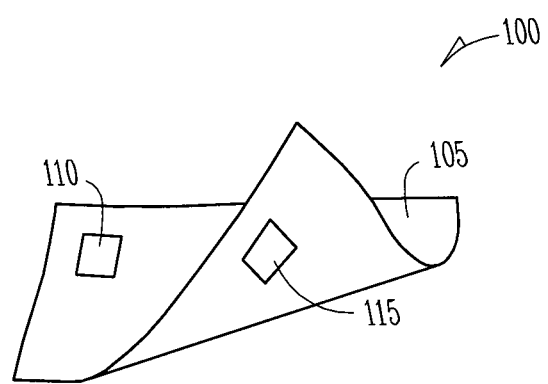
FIG. 1 illustrates generally an example of a portion of a system including an asset having a front and a back, a detector, and an emitter.

This document describes, among other things, an identification friend or foe (IFF) system and method for covertly identifying an object as friend or foe (FoF). The present inventor has recognized, among other things, that FoF identification of an object or other asset can be made using a covert identification (ID) signal, such as a covert optical signal. The covert ID signal can be conceptualized as an identification signal, such as an optical signal, in which at least one characteristic of the signal (e.g., the frequency, intensity, spatial arrangement, or one or more other characteristic) is deliberately varied or otherwise modulated. In certain examples, the covert ID signal as a whole can be varied, for example, such as to appear to an observer as noise. In an example, if the object is a concealed object, FoF identification can be made using a covert ID signal, such as a covert optical signal, without compromising the concealment of the object. In this example, the covert ID signal can remain essentially undetectable or below a noise floor unless a key or other information about at least one characteristic of the signal or an encoding sequence is known to an observer or detecting system. In an example, if the key or other information about the characteristic of the covert ID signal is known, then the covert ID signal can be detected. In other examples, if the object is a covert object, FoF identification can be made using a covert ID signal, such as a covert optical signal, such as to inhibit or prevent impersonation or to otherwise conceal the identification of the object. The covert optical signal can include electromagnetic radiation (EM) in the visible range (e.g., EM radiation from approximately 400 nm-700 nm), in the infrared (IR) range (e.g., EM radiation from approximately 750 nm-1 mm), the IR range including the near IR range (e.g., EM radiation from approximately 750 nm-1.4 µm), or in the ultraviolet (UV) range (e.g., EM radiation from approximately 1 nm-400 nm), the UV range including the near UV (NUV) range (e.g., EM radiation from approximately 200 nm-400 nm). In certain examples, the system or method can be used for IFF asset identification (e.g., for avoidance of friendly fire), or the system or method can be used for other purposes, such as for enhanced situational awareness (e.g., mapping the position of otherwise covert assets).

In an example, a covert ID signal, such as a visible covert optical signal, can be included with a camouflage signal, such as by encoding the camouflage signal with the covert ID signal. In an active camouflage example, the covert ID signal can actively modulate a fed-back intensity of an active cloaking unit, as explained below. In a passive camouflage example, a light emitter (e.g., a visible or non-visible light emitter), an embedded fiber, or a front or backside illuminator can provide the additional covert ID signal. The covert ID signal can be encoded in a number of ways, such as distributed in time or distributed in space. In certain examples, the covert ID signal can be at an intensity level that is below a noise floor, and thus, virtually impossible to detect if the encoding sequence is not compromised. However, in this example, if information about one or more characteristic of the signal or the encoding sequence, such as a key, is known, then the covert ID signal can be detected or encoded.

FIG. 1 illustrates generally an example of a portion of a system 100 including an asset 105 having a front and a back, an ambient detector 110, and an emitter 115. The asset 105 can include any object desired to be camouflaged, such as an unmanned aerial vehicle (UAV), a person, a ground vehicle, or some other object, such that the object becomes more difficult to discern by a viewing observer. Active camouflage can be conceptualized as disguising an object by actively changing its outer appearance to substantially mimic the object's background, such that as the background changes, the outer appearance can also change. One example of active camouflage can include disguising an object by emitting a time variable light signal from the front of an object that mimics the object's background even if the background should change. Other examples of active camouflage can include reflecting light or otherwise actively changing the outer surface of the object to reduce the object's visibility. Passive camouflage can be conceptualized as disguising an object by passively changing the object's outer appearance to blend in with its general surroundings, however, the outer appearance generally will not change in accordance with a change in the surroundings.

In an active camouflage example, the asset 105 can be disguised by detecting the view from the back of the asset 105 using the ambient detector 110 and mimicking the detected view from the back of the asset 105 on the front of the asset 105 using the emitter 115 to provide light, such as at a desired color or intensity. In this example, the asset 105, when viewed from the front, should appear to the viewer like the background of the asset 105. This creates the appearance that the object is not there. In other examples, the background view from one or more other directions of the asset 105 can similarly be detected and mimicked, such as from at least a portion of the outer surface of the asset 105, or the entire outer surface of the asset 105. In another example, the emitter 115 can be configured to disguise the asset 105 as another object instead of mimicking the background of the object.

The ambient detector 110 can include any device configured to detect a background view, such as from an outer surface of the asset 105 (e.g. an ambient light signal from the outer surface of the asset 105), such as a charge coupled device (CCD), a complementary metal-oxide-semiconductor (CMOS) sensor, or other light or image sensor.

In an example, the emitter 115 can include any device configured to emit light, such as to mimic the detected background view or the detected ambient signal from the ambient detector 110, or to mimic another object. In certain examples, the emitter 115 can include a light source, such as an incandescent lamp, a gas discharge lamp, a liquid crystal display (LCD), a thick film electroluminescence (TFEL), a light emitting diode (LED) (such as an inorganic LED (ILED), an organic LED (OLED), a quantum dot LED (QDLED), or one or more other LEDs), or one or more other light sources.

In an example, the asset 105 can include one or more detectors, such as the ambient detector 110, configured to detect at least a portion of a background view from an outer surface of the asset 105. The asset 105 can also include one or more emitters, such as the emitter 115, such as to cover at least a portion of the outer surface of the asset 105, such as the portion of the outer surface to be camouflaged (e.g., the bottom of a UAV, the top or side of a ground vehicle, or any other surface).

Figure 2A:
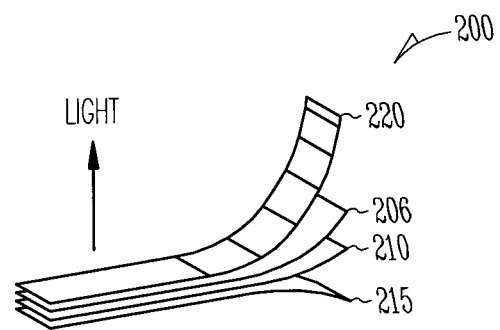
FIG. 2a and FIG. 2b illustrate generally an example of a portion of a system including a QDLED panel.
Figure 2B:
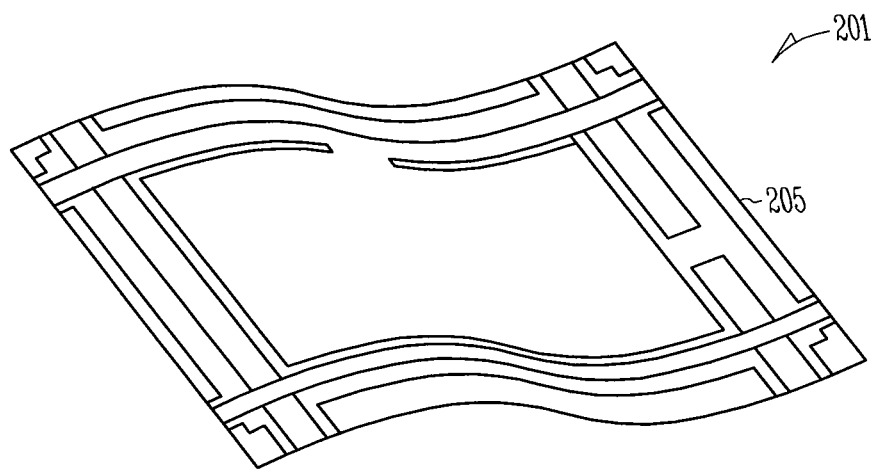

FIG. 2a and FIG. 2b illustrate generally an example of portions of systems 200 and 201 including a QDLED panel 205. In an example, an emitter, such as the emitter 115, can include an array of QDLEDs, such as a QDLED 206. The QDLED panel 205 can be constructed as a flexible panel and can be configured to be attached to the outer surface of an asset. The QDLED panel 205 can be attached to the surface of the asset using an adhesive 215. The adhesive 215 can be coupled to the QDLED 206 using a laminate 210. Further, the QDLED 206 can be covered with a substrate with interconnect 220 that can protect the QDLED 206 from the environment and connect the array of QDLEDs, QDLED 206, with one or more other arrays. By connecting the one or more QDLED panels, the at least a portion of the outer surface of the asset can be covered, and thereby camouflaged, using the one or more QDLED panels.

Figure 3A:
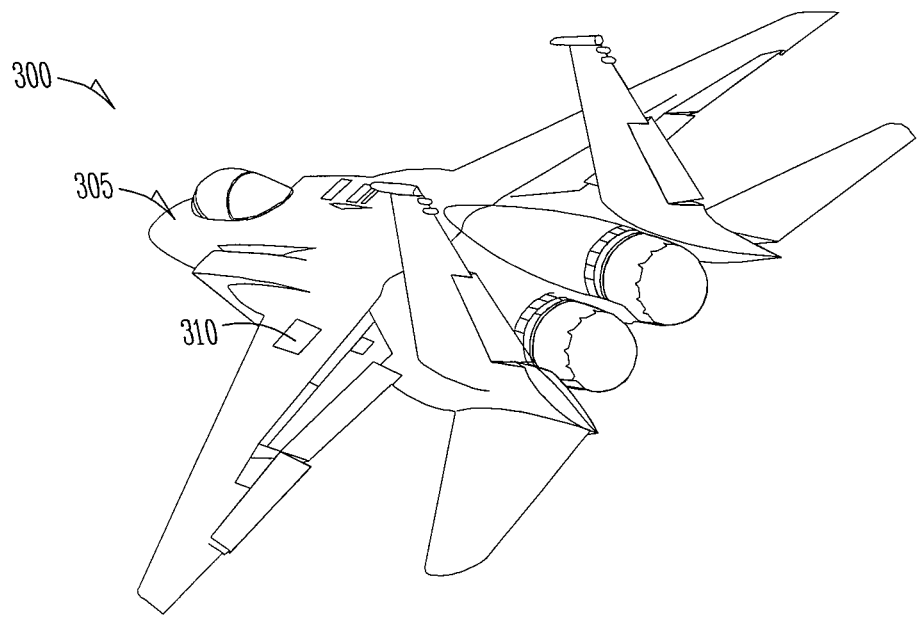
FIG. 3a and FIG. 3b illustrate generally an example of a portion of a system including an unmanned aerial vehicle (UAV), a detector, and an emitter.
Figure 3B:
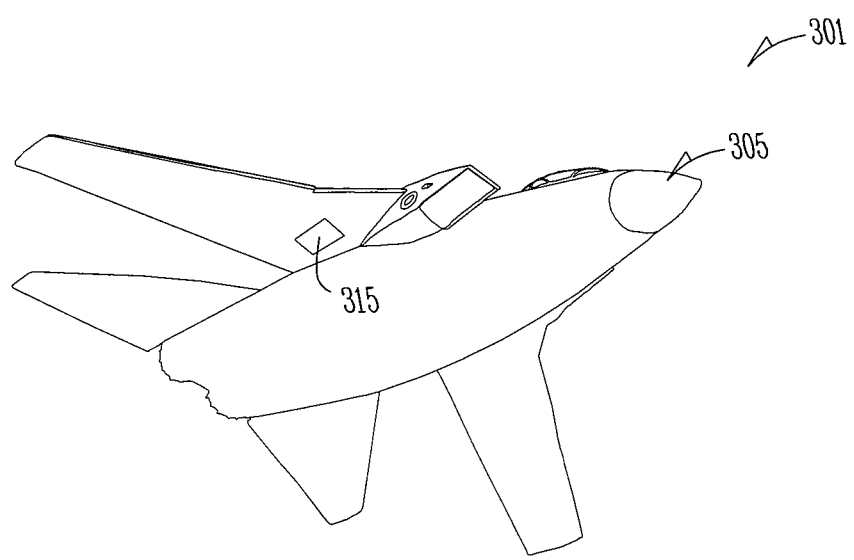

FIG. 3a and FIG. 3b illustrate generally examples of portions of systems 300 and 301 including an unmanned aerial vehicle (UAV) 305, an ambient detector 310, and an emitter 315. In this example, the asset is a UAV 305. The portion of the outer surface of the asset desired to be camouflaged is the bottom of the UAV 405, in this example. The ambient detector 310 is configured to detect the background view from the top of the UAV 305, and the emitter 315 is configured to mimic the detected background view on the bottom of the UAV 305, thereby camouflaging the UAV 305 by making the bottom of the UAV 305 appear like the view from the top of the UAV 305. In an example, at least a portion of the outer surface of the UAV 305 can camouflaged by covering the desired portion of the outer surface of the UAV with emitters, such as the entire bottom surface of the UAV to camouflage the entire bottom surface of the UAV 305, or the entire UAV 305 to camouflage the entire outer surface of the UAV 305. The detectors can be placed so as to not interfere with the emitters, but still record the necessary outer view of the asset.

Figure 4:
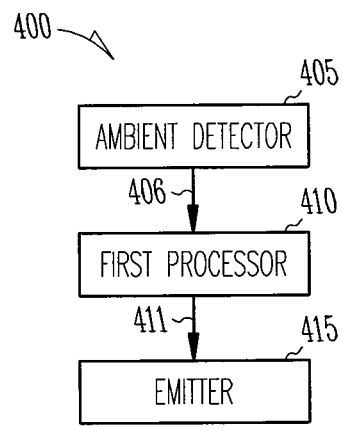
FIG. 4 illustrates generally an example of a system including a detector, a first processor, and an emitter.

FIG. 4 illustrates generally an example of a system 400 including an ambient detector 405, a first processor 410, and an emitter 415. In this example, the ambient detector 405 can be configured to detect the background view of an asset and provide a detected ambient signal 406 to the first processor 410. The first processor 410 can include processor, a central processing unit (CPU), a graphics processing unit (GPU), a controller, a microcontroller, or one or more other processors or combinations of analog or digital components configured to perform one or more functions or operations. In an example, the first processor 410 can be configured to receive the detected ambient signal 406 from the ambient detector 405 and produce an illumination signal 411 to be displayed by the emitter 415. In an example, the asset can be camouflaged by emitting the illumination signal 411 at its outer surface using the emitter 415.

In an example, the system 400 can include an amplifier configured to amplify the illumination signal 411 to be emitted by the emitter 415. In certain examples, the first processor 410 can include the amplifier, or the amplifier can be an separate component coupled to the first processor 410 and the emitter 415.

Figure 5:
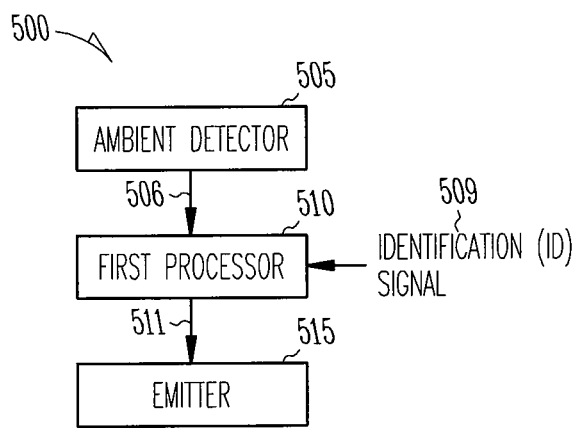
FIG. 5 illustrates generally an example of a system including a detector, an identification (ID) signal, a first processor, and an emitter.

FIG. 5 illustrates generally an example of a system 500 including an ambient detector 505, an identification (ID) signal 509, a first processor 510, and an emitter 515. In this example, the ambient detector 505 can be configured to detect the background view of an asset and provide a detected ambient signal 506 to the first processor 510. The first processor 510 can be configured to receive the detected ambient signal 506 from the ambient detector 505. In an example, the first processor 510 can be configured to produce an encoded illumination signal 511 using the detected ambient signal 506 and the ID signal 509 and to provide the encoded illumination signal 511 to the emitter 515. Once emitted, the encoded illumination signal 511 appears to an observer to be substantially similar to the detected ambient signal 506. Thus, the ID signal 509 is virtually undetectable without knowing in advance what specific ID signal or corresponding ID key to look for because the ID signal 509 appears to an observer as noise.

Figure 6:
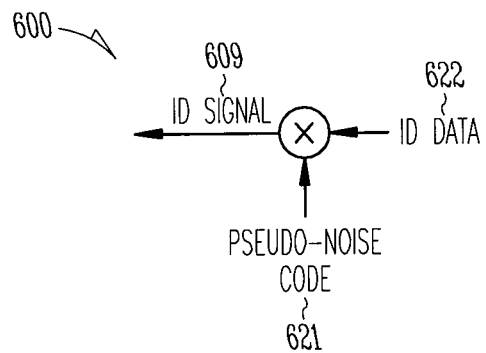
FIG. 6 illustrates generally an example of a portion of a system including an ID signal.

FIG. 6 illustrates generally an example of a portion of a system 600 including an ID signal 609. In an example, the ID signal 609 can include a covert ID signal, such as a pseudo-noise (PN) code 621 or other ID signal 622. In certain examples, the covert ID signal can include a time or frequency component, or the covert ID signal can include a spatial component.

In an example, the covert ID signal can include a spread spectrum signal that can include energy generated at one or more discrete frequencies deliberately spread or distributed in the time or frequency domain. In other examples, the covert ID signal can include energy generated at one or more levels deliberately spread or distributed spatially, such as by using the individual emitters (e.g., QDLED panels) along the asset. In certain examples, the ID signal can be at a level below the noise floor, and thus, virtually impossible to detect if the encoding sequence is not compromised. In an example, the covert ID signal can include identification data 622, such as an asset specific identification or other data. In other examples, the existence of the covert ID signal alone, such as a PN code 621 or other ID signal, is enough to identify an asset as FoF.

Figure 7:
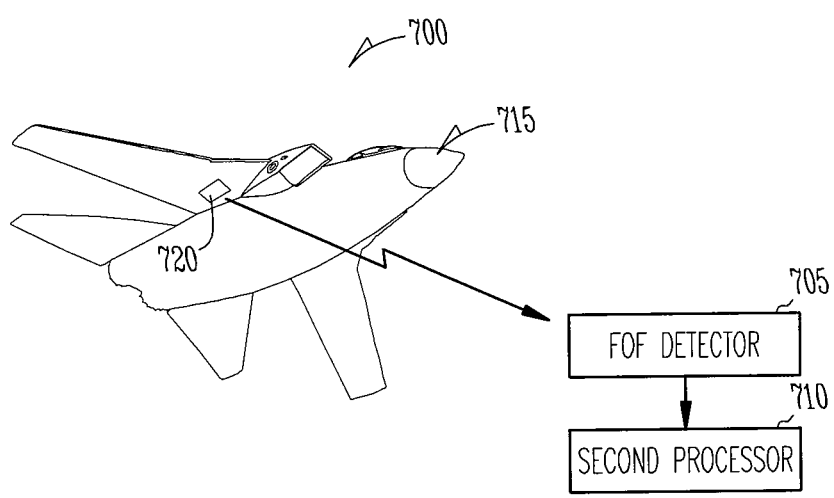
FIG. 7 illustrates generally an example of a system including a detector, a second processor, a camouflaged UAV, and an emitter panel.

FIG. 7 illustrates generally an example of a system 700 including a FoF detector 705, a second processor 710, a camouflaged UAV 715, and an emitter 720. In an example, the FoF detector 705 can include any device configured to detect an ambient signal, such as a charge coupled device (CCD), a complementary metal-oxide-semiconductor (CMOS) sensor, or one or more other light or image sensor. The FoF detector 705 can be configured to be strategically located in an area suitable for detecting a potentially camouflaged asset, such as on the ground, on a vehicle, or some other strategic location. In certain examples, the FoF detector 705 can include a detector configured to sense at least a portion of a full 360° ambient signal (e.g., a specific portion of the sky, the full aerial portion of the sky, etc.) in order to monitor the direct view from the FoF detector 705 for camouflaged UAVs.

In this example, the outer surface of the bottom of the camouflaged UAV 715 includes at least one emitter panel 720. In certain examples, the complete outer surface of the camouflaged UAV 715 viewable from the ground can be covered with emitters, such as a plurality of QDLED panels. The emitter 720 can be emitting an encoded illumination signal, thus providing the camouflage for the camouflaged UAV 715. The FoF detector 705 can be configured to detect the ambient signal from its immediate view. In this example, the detected ambient signal from the FoF detector 705 includes the emitted encoded illumination signal. The second processor 710 can be configured to receive the detected ambient signal from the FoF detector 705, analyze the detected ambient signal to detect an encoded illumination signal, and decode the detected encoded illumination signal using a specified key.

In this example, the specified key is specific to the encoded illumination signal. Without having the specified key, the encoded illumination signal appears to the second processor as noise, and is thus virtually undetectable.

Figure 8:
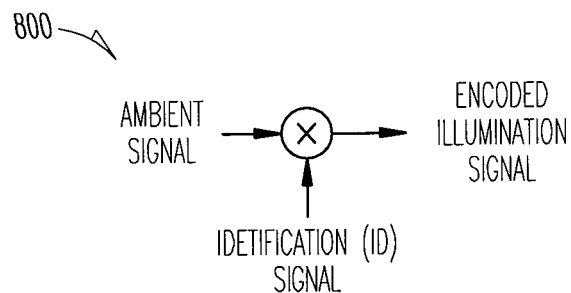
FIG. 8 illustrates generally an example of a portion of a method including encoding an ambient signal with an ID signal to create an encoded illumination signal.

FIG. 8 illustrates generally an example of a portion of a method 800 including encoding an ambient signal with an ID signal to create an encoded illumination signal. In this example, the ambient signal can be detected using an detector, such as ambient detector 505, the encoded illumination signal can be created using a processor, such as the first processor 510, and the encoded illumination signal can be emitted using an emitter, such as the emitter 515.

Figure 9:
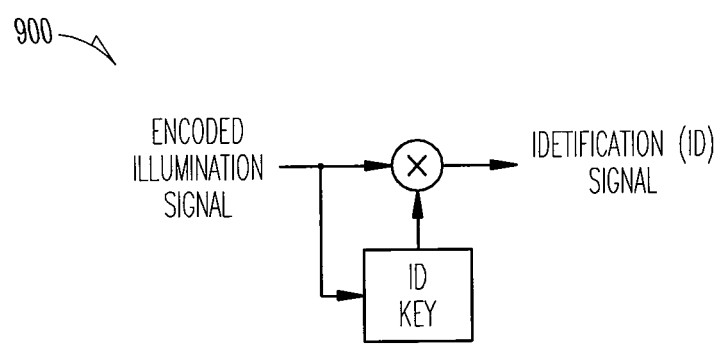
FIG. 9 illustrates generally an example of a portion of a method including decoding an ID signal from an encoded illumination signal using an ID Key.

FIG. 9 illustrates generally an example of a portion of a method 900 including decoding an ID signal from an encoded illumination signal using an ID Key. In this example, the encoded illumination signal can be detected using a detector, such as FoF detector 705, and the ID signal can be decoded using a processor, such as the second processor 710.

Figure 10:
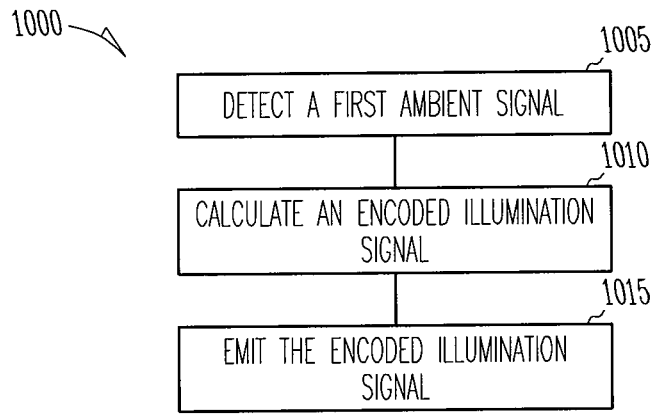
FIG. 10 illustrates generally an example of a method including detecting an ambient signal, calculating an encoded illumination signal, and emitting the encoded illumination signal.

FIG. 10 illustrates generally an example of a method 1000 including detecting a first ambient signal, calculating an encoded illumination signal, and emitting the encoded illumination signal.

At 1005, a first ambient signal is detected. The first ambient signal can include the view from an outer surface of an object, such as an asset. In an example, first ambient signal can be detected using a detector, such as the ambient detector 505.

At 1010, an encoded illumination signal is determined. The encoded illumination signal can include an illumination signal. The illumination signal includes a signal that once emitted appears substantially similar to the detected first ambient signal. In an example, the illumination signal can be created using a processor, such as the first processor 510. The encoded illumination also includes an identification (ID) signal. The ID signal can include a covert signal, such as a pseudo-noise (PN) code or other ID signal. In an example, the illumination signal can be encoded with the ID signal using a processor, such as the first processor 510.

At 1015, the encoded illumination signal is emitted. In an example, the encoded illumination signal can be emitted using an emitter, such as the emitter 515.

Figure 11:
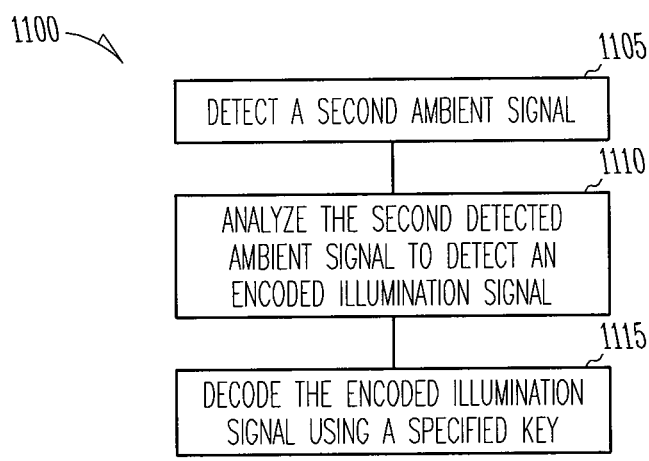
FIG. 11 illustrates generally an example of a method including detecting an ambient signal, analyzing the detected ambient signal to detect an encoded illumination signal, and decoding the encoded illumination signal using a specified key.

FIG. 11 illustrates generally an example of a method 1100 including detecting a second ambient signal, analyzing the detected second ambient signal to detect an encoded illumination signal, and decoding the encoded illumination signal using a specified key.

At 1105, a second ambient signal is detected. The second ambient signal can include at least a portion of a full 360° ambient signal from a detection point, such as the full 360° field of view from a detector. In an example, the second ambient signal can be detected using a detector, such as the FoF detector 705.

At 1110, the detected second ambient signal is analyzed to detected an encoded illumination signal. The encoded illumination signal can only be detected using information from the ID signal used to create the encoded illumination signal, e.g., a specified key. In an example, if certain information exists at specified distinct frequencies, times, or spatial coordinates in the detected second ambient signal, then the detected second ambient signal can include the encoded illumination signal. In an example, the detected second ambient signal can be analyzed using a processor, such as the second processor 710.

At 1115, the encoded illumination signal is decoded using a specified key. Once decoded, the ID signal or other information encoded in the encoded illumination signal can be ascertained. In an example, the encoded illumination signal can be decoded using a processor, such as the second processor 710.

Additional Notes

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. In an example, a first processor and a second processor can include, or can be included as at least a portion of a single processor.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A covert identification system comprising:
   an ambient detector configured to detect a first ambient light signal from a first location on an outer surface of an object;
   an emitter configured to emit a second ambient light signal from a second location on the outer surface of the object; and
   a first processor coupled to the ambient detector and the emitter, the first processor configured to:
   (1) receive the first ambient light signal from the ambient detector;
   (2) calculate an encoded illumination signal using the received first ambient light signal and an identification (ID) signal; and
   (3) output the encoded illumination signal to the emitter for emitting the second ambient light signal using the encoded illumination signal;
   wherein the ID signal in the second ambient light signal output by the emitter is undetectable in the absence of a specified key.

2. The system of claim 1, wherein the encoded illumination signal includes at least a portion of the detected first ambient light signal.

3. The system of claim 1, wherein the first location on the outer surface of the object is adjacent to the second location on the outer surface of the object.

4. The system of claim 1, wherein the first location on the outer surface of the object is opposite to the second location on the outer surface of the object.

5. The system of claim 1, wherein the emitter includes an array of quantum dot light emitting diodes (QDLEDs) configured to be attached to the outer surface of an object.

6. The system of claim 1, wherein the ID signal includes a covert ID signal.

7. The system of claim 6, wherein the covert ID signal includes a signal below a noise floor.

8. The system of claim 1, including:
   a friend or foe (FoF) detector configured to detect the second ambient signal; and
   a second processor configured to analyze the detected second ambient signal to:
   (1) detect the encoded illumination signal; and
   (2) decode the ID signal from the detected encoded illumination signal using the specified key.

9. A covert identification system comprising:
   means for receiving an ambient light signal at a first location on an outer surface of an object;
   means for calculating an encoded illumination signal using the ambient light signal and an identification (ID) signal; and
   means for outputting the encoded illumination signal from a second location on the outer surface of the object such that the ID signal in the encoded illumination signal is undetectable in the absence of a specified key.

10. A covert identification method comprising:
    detecting a first ambient light signal with an ambient detector at a first location on an outer surface of an object;
    receiving, at a processor, the first light ambient signal from the ambient detector;
    calculating, with the processor, an encoded illumination signal using the first ambient light signal and an identification (ID) signal;
    outputting the encoded illumination signal to an emitter; and
    emitting the encoded illumination signal from the emitter at a second location on the outer surface of the object;
    wherein the ID signal in the encoded illumination signal output by the emitter is undetectable in the absence of a specified key.

11. The method of claim 10, wherein the emitting the encoded illumination signal includes emitting at least a portion of the detected first ambient signal.

12. The method of claim 10, wherein the detecting from the first location on the outer surface of the object includes detecting from a location adjacent to the second location on the outer surface of the object.

13. The method of claim 10, wherein the detecting from the first location on the outer surface of the object includes detecting from a location opposite to the second location on the outer surface of the object.

14. The method of claim 10, wherein the calculating the encoded illumination signal using the ID signal includes using a covert ID signal.

15. The method of claim 14, wherein the using the covert ID signal includes using a signal below a noise floor.

16. The method of claim 10, wherein the emitting the encoded illumination signal includes using an array of quantum dot light emitting diodes (QDLEDs) configured to be attached to an outer surface of an object.

17. The method of claim 10, including:
  detecting a second ambient signal;
  analyzing the second detected ambient signal to detect the encoded illumination signal; and
  decoding the ID signal from the detected encoded illumination signal using the specified key.

\* \* \* \* \*